V. H. CONLEY.
SOUNDING DEVICE.
APPLICATION FILED AUG. 28, 1920.

1,405,292.

Patented Jan. 31, 1922.

WITNESSES

INVENTOR
V. H. CONLEY
BY
ATTORNEYS

UNITED STATES PATENT OFFICE.

VICTOR HUGO CONLEY, OF ELIZABETH, NEW JERSEY.

SOUNDING DEVICE.

1,405,292.  Specification of Letters Patent.  Patented Jan. 31, 1922.

Application filed August 28, 1920. Serial No. 406,533.

*To all whom it may concern:*

Be it known that I, VICTOR H. CONLEY, a citizen of the United States, and resident of Elizabeth, in the county of Union and State of New Jersey, have invented a new and Improved Sounding Device, of which the following is a full, clear, and exact description.

It is well appreciated in connection with the navigation of vessels, that it is often desirable to ascertain the exact depth of the water upon which the vessel is floating. With this in view, it has heretofore been customary to employ what is commonly known as a lead line.

This device consists, as is well known, of a heavy cylindrical member having one of its ends attached to a cable. In the use of this device, it was necessary to bring the vessel to an almost complete stop, and to cast the lead as far in advance of the course as possible, so that the same would be capable of striking the bottom by the time the vessel was passing over the spot at which the lead entered the water.

It is well appreciated that this is not a desirable course to follow, in view of the fact that it is almost incumbent upon the vessel to come to a stop to permit the lead to reach the bottom, at the same time, the vessel is passing over the stop as aforestated, so that an approximately accurate measurement of the line which has been taken out by the lead may be had.

With this in view, a device has been utilized which embodied a blade-like structure provided with planes or fins arranged at an angle to the horizontal, which device was trailed from a lead line extremely near the bow of the boat. Due to the inclination of the planes it was theoretically not necessary to slow the speed of the vessel in view of the fact that it was found that the planes would force the sounding device constructed in this manner, to a position nearly vertically below the keel of the vessel.

This sounding device has failed to accomplish its purpose in that the device, although forcing its way downwardly against the action of the vessel's motion, caused the line to extend in the form of a bow so that no accurate measurement of the depth might be hoped for.

Further, the device far from extending vertically below the point of entrance of the line into the water, trailed to the rear of the same at a point proportionate to the depth. Also, this device was subject to a yawing action due to which motion an accurate measurement was further prevented.

Aside from this, a sounding device constructed in accordance with the last mentioned principle was incapable of adjustment to cause its action proportionate to the speed of the vessel.

With these defects in mind, I have now constructed a sounding device by means of which an accurate sounding might be taken.

A further object of my invention is the construction of a sounding device in which yawing will be eliminated, and A still further object of my invention is the provision of a device of this character, which may be adjusted according to the nature of the work to which it is to be subjected.

Reference is had to the attached sheet of drawings as illustrating one practical embodiment of my invention, and in which—

Figure 1:
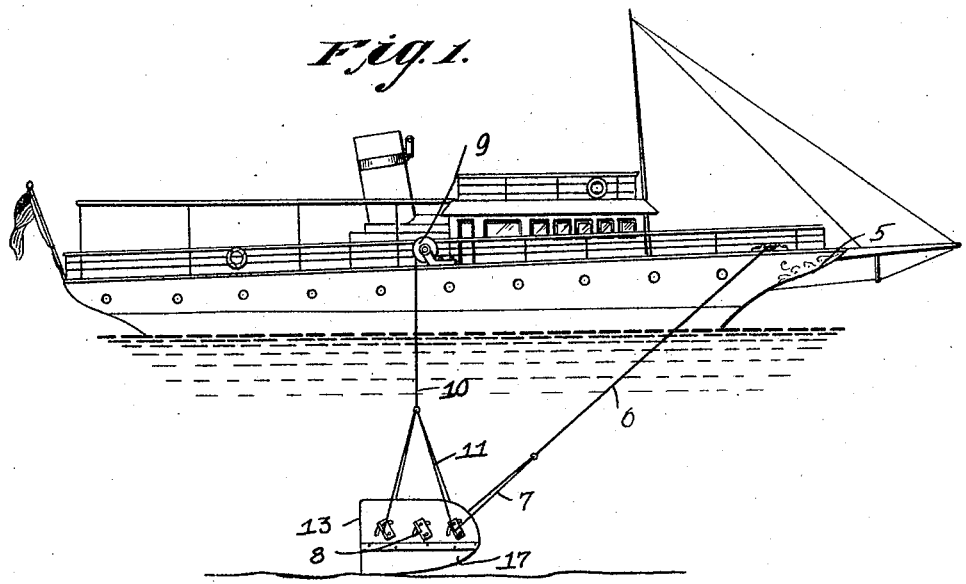
Figure 1 is a side view of a vessel with my improved sounding device attached thereto, showing the same in use, it being noted that the sounding device is exaggerated in size.
Figure 2:
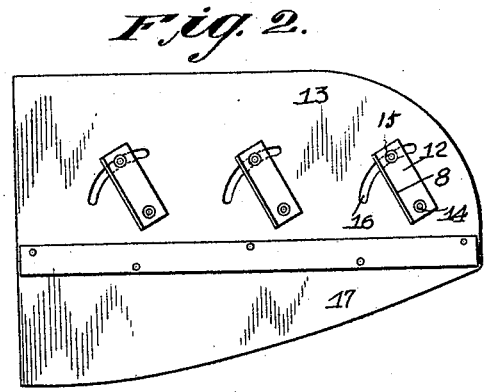
Figure 2 is a side view of the sounding device.
Figure 3:
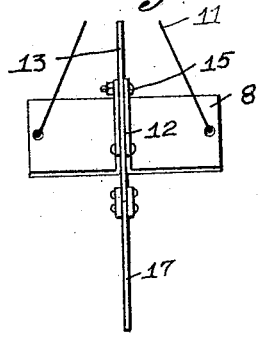
Figure 3 is a front view of the same.

In these views, the reference numeral 5 indicates a vessel, from the bow of which the lead or trailing line 6 of any desirable construction is suspended, it being noted that the lower end of this line is conveniently forked as at 7, and attached to the fins 8 of the device, so that the same may be trailed from the bow of the boat, it being noted that the line may be paid out in any suitable manner.

Contrary to the conventional construction however, a spring drum or other suitable reeling device 9 carries a line 10, it being noted that the drum or other supporting device for the line 10 is preferably positioned amidships, or adjacent the stern of the vessel 5.

The lower end of the line 10 connects with a bridle 11, the ends of which are conveniently secured in any suitable manner adjacent the outer end of the forward and rearmost fins 8.

By this construction a yawing of the device will be prevented, and it will be understood that the depth may be ascertained by a measuring of the line 10, or by triangulation, the latter being found in the known length of the lines 6 and 10 and the angle which the same present to a horizontal surface.

To now provide a sounding device which will be capable of adjustment in varying the speeds of the vessel, I conveniently form the fins 8 of strips of metal having their inner ends upturned at right angles to the body portion thereof, as has been indicated at 12, so that the inner faces of the upturned portions may lie flush against the inner faces of the blade 13 of the device.

It is to be noted that curved slots 16 are cut through the body of the blade 13, such slots corresponding in number to the pairs of fins 8 used. These slots correspond to an arc of a circle having as its center, the pivot 14, which passes through pairs of fins 8 and permits of their angular adjustment, such adjustment being maintained by any suitable securing means such as a bolt and nut 15 passing through the upturned portions 12 of adjacent pairs of fins 8, and through the slot 16.

By this construction it will be understood that the angle of the fins 8 may be adjusted proportionate to the speed of the vessel so that a correspondingly downward pressure may be brought into being upon the sounding device being lowered below the surface of the water.

Also a keel 17 may conveniently be affixed to the blade 13, and extend below the same so that the device as a whole may ride clear of obstructions upon the bottom.

Obviously numerous modifications of structure may readily be resorted to without in the least departing from the spirit of my invention, which I claim as—

1. A sounding device, including a blade, fins secured to and extending outwardly from said blade and being adapted to lie at an angle to the direction of travel of the same, and means by which the angle of the blades can be varied.

2. A sounding device, including a blade, fins secured to said blade, a trailing line adapted to extend from a vessel and having said blade secured to its lower end, and a second line extending between said blade and the deck head of a vessel said latter line being adapted to lie in a substantially vertical position having its lower end attached to said fins, and a bridle having its lower ends secured adjacent the outer ends of said fins, the upper end of said bridle engaging the lower end of said second line.

3. A sounding device, including a blade formed with a plurality of curved slots, fins pivotally secured to said blade on opposite sides thereof, and means engaging said fins and passing through said slots for retaining said fins in angular adjustment.

4. A sounding device, including a blade formed with a plurality of curved slots, a plurality of fins, comprising a body portion and an upturned inner end, said upturned inner end being adapted to lie flush against one of the side faces of said blade, pivots adapted to pass through the upturned ends of said fins and blade, whereby to permit a swinging motion of the fins, and securing means also passing through the upturned ends of certain of said fins and through a slot formed in the blade.

VICTOR HUGO CONLEY.